US009854757B2

(12) United States Patent
Carvalho (10) Patent No.: US 9,854,757 B2
(45) Date of Patent: Jan. 2, 2018

(54) POSITION ADJUSTABLE SELF-WATERING APPARATUS FOR CONTROLLABLY DISPENSING WATER AND NUTRIENTS THROUGH CAPILLARY MOTION (71) Applicant: Riki Carvalho, Makawao, HI (US)

(72) Inventor: Riki Carvalho, Makawao, HI (US)

(*) Notice: Subject to any disclaimer, the term of this patent is extended or adjusted under 35 U.S.C. 154(b) by 133 days.

(21) Appl. No.: 15/073,203

(22) Filed: Mar. 17, 2016

(65) Prior Publication Data
US 2017/0265406 A1 Sep. 21, 2017

(51) Int. Cl.
*A01G 27/06* (2006.01)

(52) U.S. Cl.
CPC .................... *A01G 27/06* (2013.01)

(58) Field of Classification Search
CPC ...... A01G 27/00; A01G 27/006; A01G 27/02; A01G 27/04; A01G 27/06
USPC ............... 47/48.5, 79–81; 220/187
See application file for complete search history.

(56) References Cited

U.S. PATENT DOCUMENTS

| 880,968 | A | * | 3/1908 | Bunker | A01G 27/04 119/77 |
| 4,115,951 | A | * | 9/1978 | Becker | A01G 27/06 220/86.1 |
| 4,782,627 | A | * | 11/1988 | Hauk | A01G 27/06 47/48.5 |
| 5,329,729 | A | * | 7/1994 | Liang | A01G 27/005 47/81 |
| 2002/0020111 | A1 | * | 2/2002 | Rosenberg | A01G 27/006 47/48.5 |
| 2004/0139650 | A1 | * | 7/2004 | Haq | A01G 27/003 47/48.5 |
| 2009/0288342 | A1 | * | 11/2009 | Hui | A01G 27/006 47/79 |

* cited by examiner

*Primary Examiner* — William V Gilbert
(74) *Attorney, Agent, or Firm* — Steven Rinehart (57) ABSTRACT A position adjustable self-watering apparatus controllably dispenses water and nutrients by transmitting water from a primary reservoir to a second end of a tube, and selectively dispensing the liquid over a desired region of the soil. Capillary motion through a dual action wick carries the water. The tube adjustably positions over a desired region of soil through multiple means. Anchor rods that support the primary reservoir can selectively couple with correlating reception apertures in the bottom wall of the primary reservoir. Repositioning of anchor rods enables the primary reservoir to move relative to the plant container. Additionally, the tube incrementally and fixedly reorients in multiple directions. Additionally, when the container edge wedges between the anchor rod and the sidewalls of the primary reservoir, the primary reservoir slides along the container edge to a desired region above the soil. A primary reservoir valve helps regulate the flow of the liquid.

20 Claims, 10 Drawing Sheets

POSITION ADJUSTABLE SELF-WATERING APPARATUS FOR CONTROLLABLY DISPENSING WATER AND NUTRIENTS THROUGH CAPILLARY MOTION

The application claims priority to U.S. Provisional application 62/161,985 filed May 20, 2015 for Riki Carvalho entitled "Position Adjustable Self-Watering Apparatus for Controllably Dispensing Water and Nutrients Through Capillary Motion."

FIELD OF THE INVENTION

This invention relates to a position adjustable self-watering apparatus for controllably dispensing water and nutrients to plants through capillary motion, and more particularly relates to a position adjustable self-watering apparatus that uses capillary motion to controllably dispense water and nutrients to plants, and is supported over the plant by at least one anchor rod that adjustably positions the apparatus relative to the plant for selective positional dispensing, and a tube the incrementally and fixedly reorients over the plant, and a primary reservoir that slides along the edge of a plant container to adjust position over the plant container.

BACKGROUND

Description of the Related Art

Typically, plants are grown in various dwelling, workplace, and entertainment environments to beautify and enrich the appearance of a room or garden. The plants are often located in environments which render them easy to maintain and care for. It is known that plants require regular watering and nutritional enhancement to grow properly. The plants are generally grown in plant containers containing soil. The plant is usually watered from the top while in the plant container, thereby saturating the top of the soil. For some plants and soils, this encourages insects and molds.

In many instances, plants are utilized in environments or situations which render their attention and care difficult or sporadic. For example, such plant enhancements are frequently located in areas which are difficult to access such as upper portions of rooms or building exteriors. Similarly, the plants may be frequently used within the dwelling places of people who travel a great deal, and are therefore absent for prolonged durations.

It is known that in a plant container, such as a flower pot, water is put over the surface of the soil directly. In this manner, the water remains in the plant container for a short period. Excess water put into the plant container is drained away through the drain holes in the base of the plant container. However, regardless of the amount of water put into the plant container, the water will remain for only a short period. Rarely does a person have time to controllably water the plants with small drips of water over a long duration.

Furthermore, in the summer season, the surface soil appears dry despite the fact that water is profusely contained within the soil. In such a case, if the plant container receives water too frequently, the plant's root can rot due to the excess watering. Therefore, the troublesome task of adequately watering a plant exists.

Self-watering devices have been used in the past to controllably water the plant. However, these devices tend to be unreliable, create a mess, and tripping hazards. The user had to guess of the device was working, if the components of the device required replacement, or required a specific soil blend to operate properly. Often, the self-watering devices were bulky and difficult to transport to different plant containers or to different regions of the plant container. Further, the user had to hook the devices up to a charged hose bib that took up space and required complicated components. Thus, a need for a position adjustable self-watering apparatus for controllably dispensing water and nutrients through capillary motion is needed.

SUMMARY

From the foregoing discussion, it should be apparent that a need exists for a position adjustable self-watering apparatus that uses capillary motion to controllably dispense water and nutrients to plants, and is supported over the plant by at least one anchor rod that adjustably positions the apparatus relative to the plant container for selective positional dispensing. Beneficially, such an apparatus would allow for automated dispensing of water and nutrients over a longer duration, with minimal supervision, and selective positioning of the dispensing means relative to the plant container.

The present invention has been developed in response to the present state of the art, and in particular, in response to the problems and needs in the art that have not yet been fully solved by currently available self-watering devices. Accordingly, the present invention has been developed to provide a position adjustable self-watering apparatus for controllably dispensing water and nutrients to plants that overcome many or all of the above-discussed shortcomings in the art.

In one embodiment, the position adjustable self-watering apparatus is configured to carry a liquid, such as water and nutrients, from a primary reservoir to a second end of the tube through capillary motion. The second end of the tube selectively dispenses the liquid onto a desired region of the soil in the plant container. The liquid is transmitted from the primary reservoir to the second end of the tube through capillary motion enabled by a dual feeding wick. At least one primary reservoir valve may also be used to regulate the flow of the liquid.

The apparatus utilizes multiple means to adjust its position relative to the plant container for adjustable dispensing of the liquid over a selected region of the soil. In one positional adjustment of the apparatus, at least one anchor rod supporting the primary reservoir selectively couples with at least one reception aperture in the bottom wall of the primary reservoir to move the primary reservoir relative to the plant container. In another positional adjustment, the tube is configured to incrementally and fixedly orient to a desired direction over a desired region of the soil through a rigid, segmented configuration. In yet another positional adjustment, when the container edge wedges between the anchor rod and the sidewalls of the primary reservoir, the primary reservoir slides along the edge of the plant container to a desired region above the soil.

The position adjustable self-watering apparatus for controllably dispensing water and nutrients to plants is provided with a plurality of modules configured to functionally execute the necessary steps of controllable and selective dispensing of water and nutrients to a plant, and specifically a plant in a plant container. These modules in the described embodiments include a primary reservoir containing a predetermined quantity of water and/or nutrients. The primary reservoir substantially provides the water and nutrients to at least one plant that is growing in soil that is contained in a plant container.

The primary reservoir comprises a plurality of sidewalls, an opening, a top wall, and a bottom wall. The primary reservoir further comprises a primary reservoir outlet configured to enable passage of the water and nutrients away from the primary reservoir. A lid hingedly regulates access to the opening of the primary reservoir. A seal member positions between the lid and the edges of the opening in the primary reservoir to inhibit insects and contaminants from engaging the liquid inside the primary reservoir.

The bottom wall of the primary reservoir comprises at least one reception aperture. The reception aperture is configured to receive to at least one anchor rod. The anchor rod provides the supportive foundation and enables selective positioning of the primary reservoir relative to the plant container. The anchor rods also allows the primary reservoir to be supported generally at a higher elevation than the plant container and soil contained therein.

The at least one anchor rod may include a reservoir end that forms a snug, sealed engagement with the reception aperture. The reservoir end may be threaded or beveled to register with a correlating reception aperture. The anchor rod further includes a mount end that engages the edge of the plant container or the soil.

In one embodiment, the primary reservoir may be repositioned from a first region of the plant container, and anchored to a different region by repositioning the anchor rods to different reception apertures. In this embodiment, the reservoir end of the anchor rod is selectively coupled to different reception apertures along the bottom wall. For example, the anchor rod may be detached from a central reception aperture and moved to a left side reception aperture. This allows the primary reservoir to be selectively positioned relative to the plant container; thereby selectively dispensing the water and nutrients at a desired region of the soil in the plant container.

In another exemplary repositioning, the primary reservoir may be repositioned from a first region of the plant container, and anchored to a different region by sliding the primary reservoir and the anchor rod along the container edge to position the tube above a desired region above the soil.

In some embodiments, a tube housing positions on the lid. The tube housing serves as a fixed bracket for secure placement of a tube that facilitates the transmission of the liquid. The tube housing may include a tube connection end. The tube connection end may include a male threaded hole. The tube extends from the tube housing to the region above the soil. The tube comprises a first end that attaches to the tube connection end, and a second end that enables dispensing of the liquid. The tube has an interior volume configured to contain a portion of a dual feeding wick, as described below.

The tube facilitates the conveyance of the liquid from the primary reservoir to the plant. The tube is flexible, yet is also segmented so that it can incrementally orient to a desired position. This allows for directional positioning of the tube to a desired position over the soil in the plant container. The tube is also collapsible for enhanced storage and portability.

In this manner, adjustable positioning is possible through: positioning of the anchor rod in selected reception apertures, sliding of the primary reservoir and the anchor rod along the edge of the plant container, and incrementally and fixedly reorienting the tube. These adjustment means work together to determine the region of soil in the plant container that receives the liquid.

In some embodiments, the apparatus may utilize capillary motion to transfer the water and nutrients from the primary reservoir to the second end of the tube for dispensing on the plant. The apparatus utilizes a dual feeding wick to transfer the water from the primary reservoir to the plant. The dual feeding wick is defined by a reservoir portion that extends from the reservoir to the tube housing. From the tube housing, a tube portion of the dual feeding wick positions inside the tube, extending across the length of the tube and terminating at the second end of the tube.

The dual feeding wick operates on the principle that water is cohesive, and thus the molecules stick together. The other principle of water is adhesion, which pulls the water in a direction. Thus, the weight of the water dripping from the tube pulls the other water molecules, like a train.

It is the dual feeding wick that provides the medium for the water to controllably travel from the primary reservoir and through the tube. The size and material composition of the dual feeding wick may be altered to change the rate of dispensing. Those skilled in the art will recognize that the capillary motion enabled through the dual feeding wick ensures that the liquid supplied by apparatus does not over or under water the plant. In one embodiment, the dual feeding wick is a cotton material. In addition to the dual feeding wick, at least one primary valve may be used to regulate the water from the primary reservoir.

In some embodiments, a secondary reservoir may be used to supply apportion of the liquid to the primary reservoir. The secondary reservoir enables the apparatus to dispense liquid for a greater duration and to a greater number of plants. A secondary reservoir tube carries the liquid from the secondary reservoir to the primary reservoir. At least one secondary valve may be used to regulate the liquid from the secondary reservoir. The secondary valve may include an electronic valve, or a float valve having a valve chamber and a valve chamber orifice, and a float that work together to regulate dispensing of the liquid from the secondary reservoir to the primary reservoir.

The apparatus, in one embodiment, is configured to dispense water and nutrients to the plant and soil from any position relative to the plant container without disturbing the soil or plant.

The apparatus is further configured, in one embodiment, to selectively reposition the second end of the tube for dispensing through relocation of the anchor rod to a different reception aperture, by sliding the primary reservoir along the edge of the plant container, and through incremental and fixed reorientation of the tube.

The apparatus is further configured, in one embodiment, to help prevent root rot by perpetually dispensing water and nutrients, even when the plant is unattended for a duration.

In a further embodiment, the apparatus may be configured to prevent the soil from drying.

In a further embodiment, the apparatus may be configured to feed additional fertilizers and plant enhancement compositions to the plants in predetermined increments.

In a further embodiment, the apparatus may be configured to refill the primary reservoir easily so as to last hours or days.

In a further embodiment, the apparatus may be configured to deter mosquitoes from breeding in an open water source.

In a further embodiment, the apparatus may be configured to secure to the edge of a plant container in a nonintrusive manner and while creating a decorative effect.

In a further embodiment, the apparatus may be configured to easily detach from the plant container.

In a further embodiment, the water supplied by apparatus assures that plants will never be over or under watered.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A illustrates a perspective views of an anchor rod, where

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
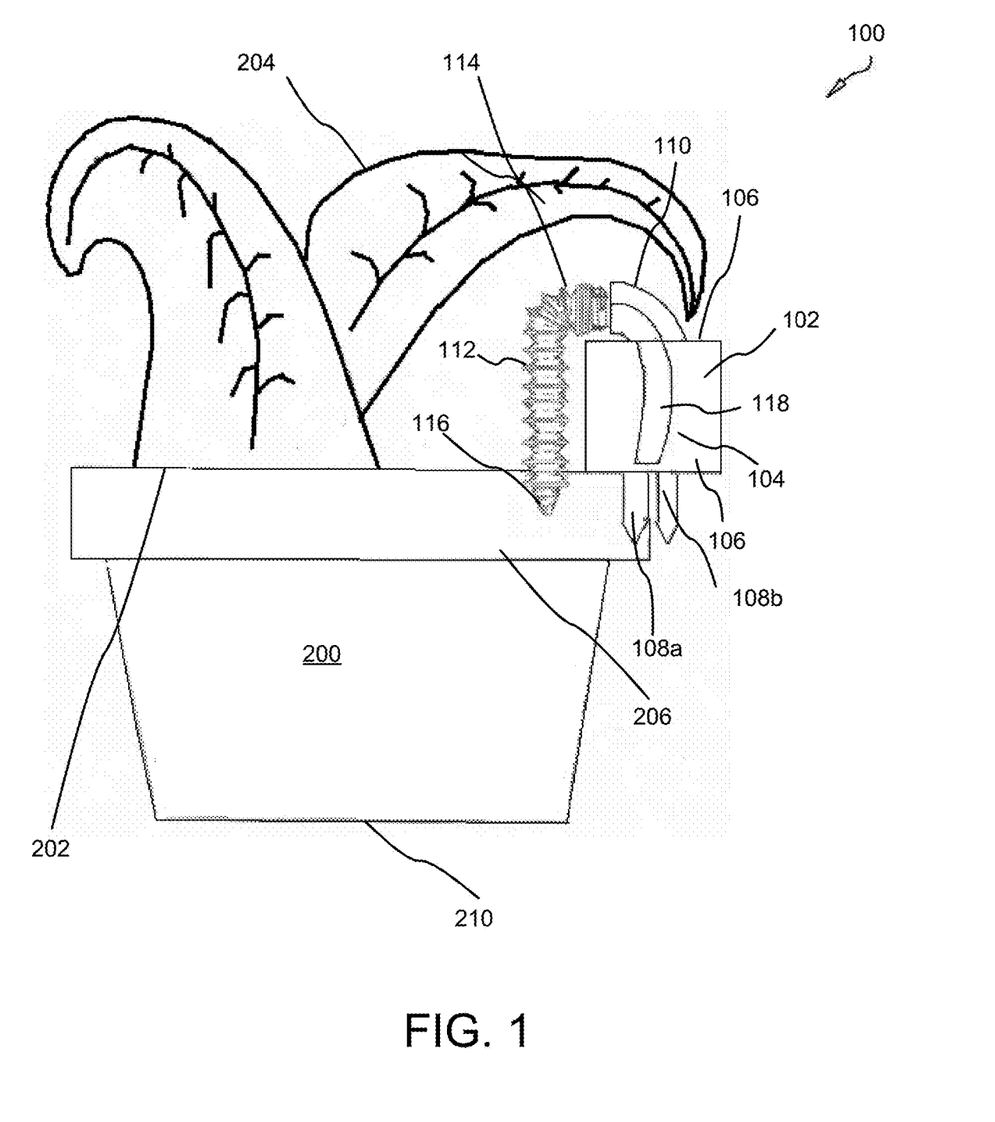
FIG. 1 is a perspective view illustrating one embodiment of a position adjustable self-watering apparatus operational on a plant container in accordance with the present invention.

FIG. 1 depicts a position adjustable self-watering apparatus 100 for controllably dispensing water and nutrients to at least one plant 204 through principles of capillary motion. The position adjustable self-watering apparatus 100, hereafter, "apparatus 100" is configured to functionally execute the necessary steps for controllable dispensing and positional adjustment while dispensing a liquid 212, such as water and nutrients, to a plant 204, and specifically a plant 204 in a plant container 200. The apparatus 100 generally operates in the environment of a plant container 200 having a container edge 202 that can support the apparatus 100. The plant container 200 may be shaped and dimensioned in any shape conducive for growing plants 204, including cylindrical, rectangular, and cubicle.

In one embodiment, the plant container 200 includes at least one release aperture 210, or weeping hole, which may be used at the base of the plant container 200 for releasing excess liquid. Though in some embodiments, the apparatus 100 may be used directly on the soil 206 without use of a plant container 200. The apparatus 100 is portable and can transfer to different plant containers and regions of the soil 206 without disturbing the plant 204 or the soil 206.

In various embodiments, the apparatus 100 and the container 200 may be formed as a single integrated piece. Alternatively, the container 200 and the reservoir 102 may be formed as a single integrated piece. The reservoir 102 may be integrated alongside the container 200, disposed on top of the container 200, and integrated towards the bottom of the container 200. In various embodiments, the apparatus 100 (comprising everything shown except the container 200, container edge 202, plant 204, and weeping hole 210) may comprise a stand-alone unit, or may be placed on or in soil in the container 200.

In various embodiments, the container 200 is molded as a single component with the reservoir 102 and/or apparatus 100. The container 200 may comprise a pot, plantar, garden box, or any other housing or container for receiving soil and growing plantlife.

Figure 2:
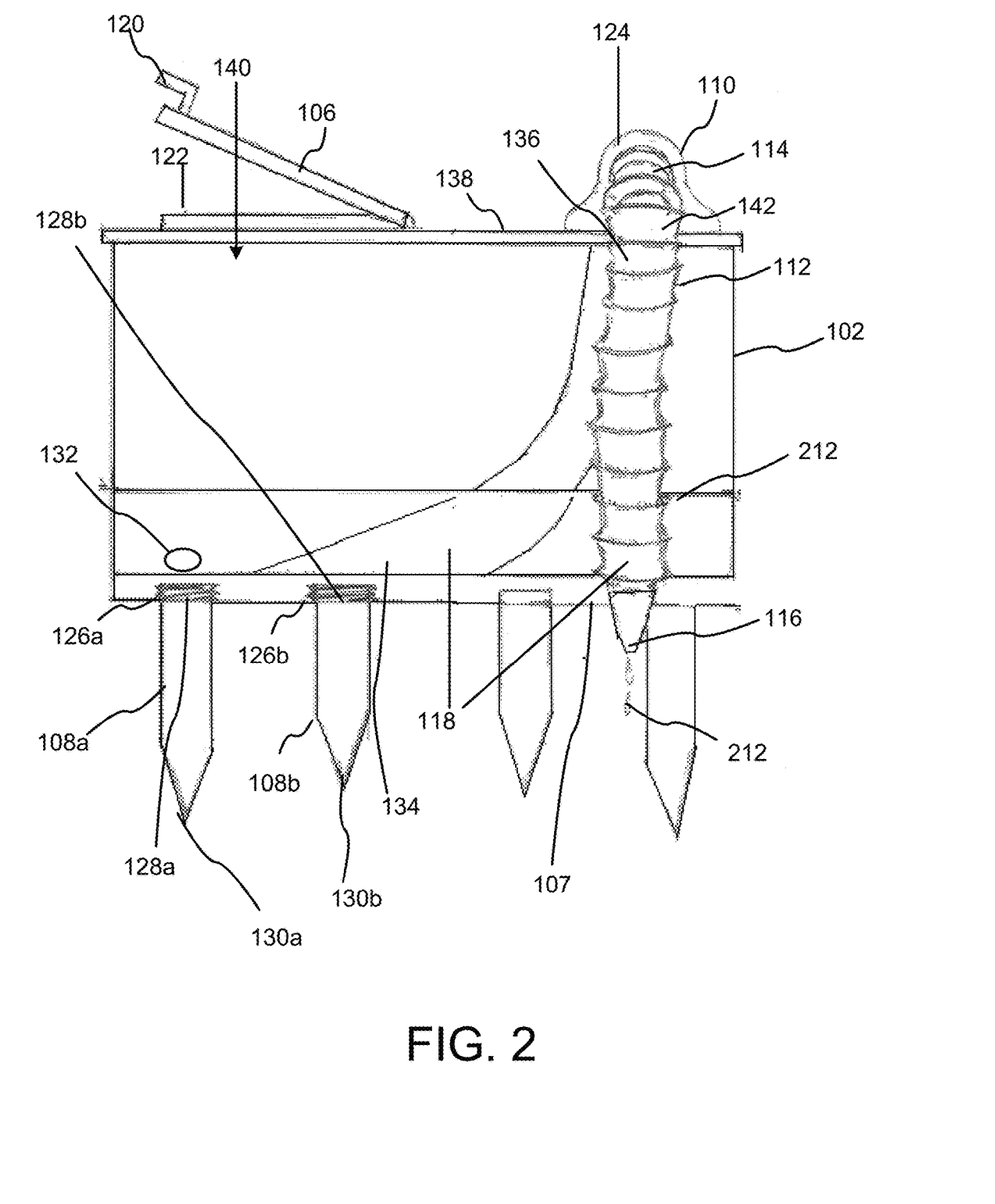
FIG. 2 is a sectioned side view illustrating the position adjustable self-watering apparatus of FIG. 1 in accordance with the present invention.

FIG. 2 is a sectioned side view of the self-watering apparatus 100 shown in FIG. 1. In some embodiments, the apparatus 100 may provide a primary reservoir 102 for storing and dispensing a predetermined quantity of the liquid 212. The primary reservoir 102 substantially provides the water and nutrients in liquid form for feeding at least one plant 204 that is growing in soil 206 inside the plant container 200. In one embodiment, the liquid 212 may include water fortified with minerals, and the nutrients may include fertilizer or a liquid nutritional supplement for plants 204. In one alternative embodiment, the liquid 212 may also include a pesticide, insecticide, or wax that are dispensed.

The tube 112 may comprise a blow-molded polymeric flexible tube, as known to those of skill in the art.

As FIG. 2 illustrates, the primary reservoir 102 comprises a plurality of sidewalls 104, an opening 140, a top wall 138, and a bottom wall 107. In one possible embodiment, the sidewalls 104 form the primary reservoir 102 into a generally rectangular shape. Though other shapes are possible. In one alternative embodiment, one of the sidewalls 104 are concave to conform to a circular edge of a plant container 200. The primary reservoir 102 further comprises a primary reservoir outlet 132 configured to enable passage of the liquid 212 from the primary reservoir 102 to the soil 206.

In some embodiments, at least one primary reservoir valve may also be used to regulate flow of the liquid 212 as it moves from the primary reservoir 102. The water level 208 in the primary reservoir substantially dictates the amount of liquid that move towards the soil 206, either through capillary motion and/or the primary reservoir valve. When a float valve is used, for example, the float rises and lowers based on the water level 208. Similarly the capacity of the capillary motion is affected by the amount of liquid 212 in the primary reservoir since adhesion and cohesion are determinative for capillary motion.

In some embodiments, a lid 106 hingedly covers the opening 140 of the primary reservoir 102 for regulating access thereto. Though in some embodiments, the lid 106 covers a portion of the opening 140, and the top wall 138 covers a portion of the opening 140. A hinge and an axis of rotation 340 enable the pivoting motion of the lid 106.

A tab 120 may extend from the lid 106 to provide a surface for gripping the lid and pivotally lifting and lowering the lid 106 on the opening 140 of the primary reservoir 102. A seal member 122 may form between the lid 106 and the edges of the opening 140 in the primary reservoir 102. The seal member 122 is configured to inhibit insects and contaminants from entering the water inside the primary reservoir 102. In one embodiment, the seal member 122 is a rubber gasket.

The bottom wall 107 of the primary reservoir 102 comprises at least one reception aperture 126a-b. The reception aperture 126a-b is configured to receive to at least one anchor rod 108a-b. The reception aperture 126a may be threaded to rotatably engage the anchor rod 108a. The reception aperture 126b may also be beveled to form a friction fit with the anchor rod 108b. The at least one anchor rod 108a-b provides the supportive foundation and positioning capacity for the primary reservoir 102, relative to the plant container 200. The anchor rod 108a-b also allows the primary reservoir 102 to be supported generally at a higher elevation than the plant container 200 and soil 206 contained therein.

The anchor rod 108a-b may include a reservoir end 128a-b that forms a snug, sealed engagement with the reception aperture 126a-b. As discussed above, the reservoir end 128a-b may be threaded or beveled to register with a correlating reception aperture 126a-b. Though in some alternative embodiments, magnets, adhesives, and screws may be used to couple the reservoir end 128a-b of the anchor rod 108a-b to the reception aperture 126a-b. The anchor rod 108a-b further includes a mount end 130a-b that engages the edge 202 of the plant container 200 and/or the soil 206 directly. In one embodiment, the mount end 130a-b is pointed so that penetration in soil 206 is facilitated.

Though, when the primary reservoir 102 is supported by the plant container 200, the container edge 202 wedges between the anchor rod 108a-b and the primary reservoir 102. The primary reservoir 102 may then slide 106 along the container edge 202 to adjust the position for dispensing the liquid 212 over a desired region of the soil 206. In one exemplary use, the primary reservoir 102 may be repositioned from a first region of the plant container 200, and anchored to a different region by sliding the primary reservoir 102 along the container edge 202 to a desired region above the soil 206 for dispensing the liquid.

In another embodiment, the primary reservoir 102 may be repositioned from a first region of the plant container 200, and anchored to a different region by repositioning the anchor rods 108a-b to different reception apertures 126a-b. In this embodiment, the reservoir end 128a-b of the anchor rod 108a-b is selectively coupled to different reception apertures 126a-b along the bottom wall 107.

For example, the anchor rod 108a-b may be detached from a central reception aperture 126a-b and moved to a left side reception aperture 126a-b. This allows the primary reservoir 102 to be selectively positioned relative to the plant container 200. And the apparatus 100 can thereby selectively dispense the water and nutrients to a desired region of the soil 206 in the plant container 200. Thus by repositioning the anchor rod 108a-b to different reception apertures 126a-b, the exact point of dispensing the water and nutrient can be regulated.

A tube housing 110 serves as a fixed bracket for secure placement of a tube 112 that facilitates the transmission of the liquid 212. In one embodiment, the tube housing 110 has a generally domed shape and fixedly rests on the lid 106. The tube housing 110 may include a tube connection end 124. The tube connection end 124 may include a male threaded hole. The tube 112 extends from the tube connection end 124 to the region above the soil 206. The tube 112 comprises a first end 114 that attaches to the tube connection end 124, and a second end 116 that enables dispensing of the liquid 212.

The tube 112 has an interior volume 142 configured to contain a portion of a dual feeding wick 118, described below. The tube 112 enables the conveyance of the liquid 212 from the tube housing 110 to the plant 204. FIG. 1 illustrates that the tube 112 is flexible, yet is also segmented so that it can incrementally orient to a desired position. This allows for directional positioning of the tube 112 to a desired position over the soil 206 in the plant container 200. In another embodiment, the tube 112 is collapsible for enhanced storage and portability.

The wick 118, and wicking material used herein, may comprise and/or be formed from any material that will wick a liquid, including cotton.

The tube 112, or positioning adjustable tube 112, may be used to rapidly start or stop the wicking action. To stop the wicking action, the second end 116 of the tube 112 is turned to point upward and raised above the level of the reservoir 102. The rapidly start the wicking action, the reservoir 102 need only be filled with water or a liquid because, in some embodiments, the lid 106 sits higher on the apparatus 100 than the connection point of the tube 112 to the lid assembly and the receiving male end of the lid assembly, as well as higher than the female end of the tube 112. The overflow from the reservoir 102 will rapidly start the wicking action and pre-hydrate the soil (further shown below in relation to FIGS. 12 and 13).

The tube 112 may connect to an exterior surface of the reservoir 102 using a clipping mechanism, or may be connected using a pipe clamp, or via any other means known to those of skill in the art. A springed lever may also be used to secure the apparatus 100 to the plant container 200.

In this manner, the positioning means includes: repositioning of the anchor rod 108a-b in selected reception apertures 126a-b, sliding of the primary reservoir 102 along the edge 202 of the plant container 200, and incrementally reorienting the tube 112 to a desired direction. These repositioning means work together to determine the region of soil 206 in the plant container 200 that receives the initial quantity of liquid 212. Though the liquid will eventually soak into the soil 206 and saturate the entire plant container 200.

In some embodiments, the apparatus 100 may utilize capillary motion to transfer the liquid 212 from the primary reservoir 102 to the second end 116 of the tube 112. In essence, water is absorbed from the primary reservoir 102 through a capillary material and ultimately dispensed onto soil 206 in the plant container 200, thereby moistening the soil 206. Those skilled in the art will recognize that the apparatus 100 operates on the principle that water is cohesive, and thus water molecules stick together. The other principle of the apparatus 100 uses the fact that water is adhesive. This adhesion between water molecules works to pull the water in a first direction. Thus, the weight of the water dripping from the tube 112 pulls the other water molecules, like a train, towards the first direction, which in this case moves from the primary reservoir 102 to the soil 206.

FIG. 2 illustrates that the apparatus 100 utilizes a dual feeding wick 118 to transfer the liquid from the primary reservoir 102 to the soil 206. The dual feeding wick 118 is defined by a wick reservoir portion 134 that extends from the primary reservoir 102 to the tube housing 110. From the tube housing 110, a wick tube portion 136 of the dual feeding wick 118 is configured to position inside the tube 112, extending across the length of the tube 112 and terminating at the second end 116 of the tube 112. In one possible embodiment, the wick tube portion 136 abuts the base of the plant container 200, such that soil 206 or roots within the release apertures 210 of the plant container 200 lie adjacent to a portion of the dual feeding wick 118.

The capillary motion enabled through the dual feeding wick 118 ensures that the liquid 212 supplied by the primary reservoir 102 does not over or under water the plant 204. Thus, it is the dual feeding wick 118 that provides the medium for the water to controllably travel from the primary reservoir 102 and through the tube 112. The size and material composition of the dual feeding wick 118 may be altered to change the rate of dispensing. In one embodiment, the dual feeding wick 118 is a cotton material.

In addition to the dual feeding wick 118, at least one primary valve may be used to regulate, direct, and control the flow of the water from the primary reservoir 102. The primary valve may include, without limitation, a ball float valve, an automated electrical valve, a butterfly valve, a globe valve, and a two port valve.

Figure 3:
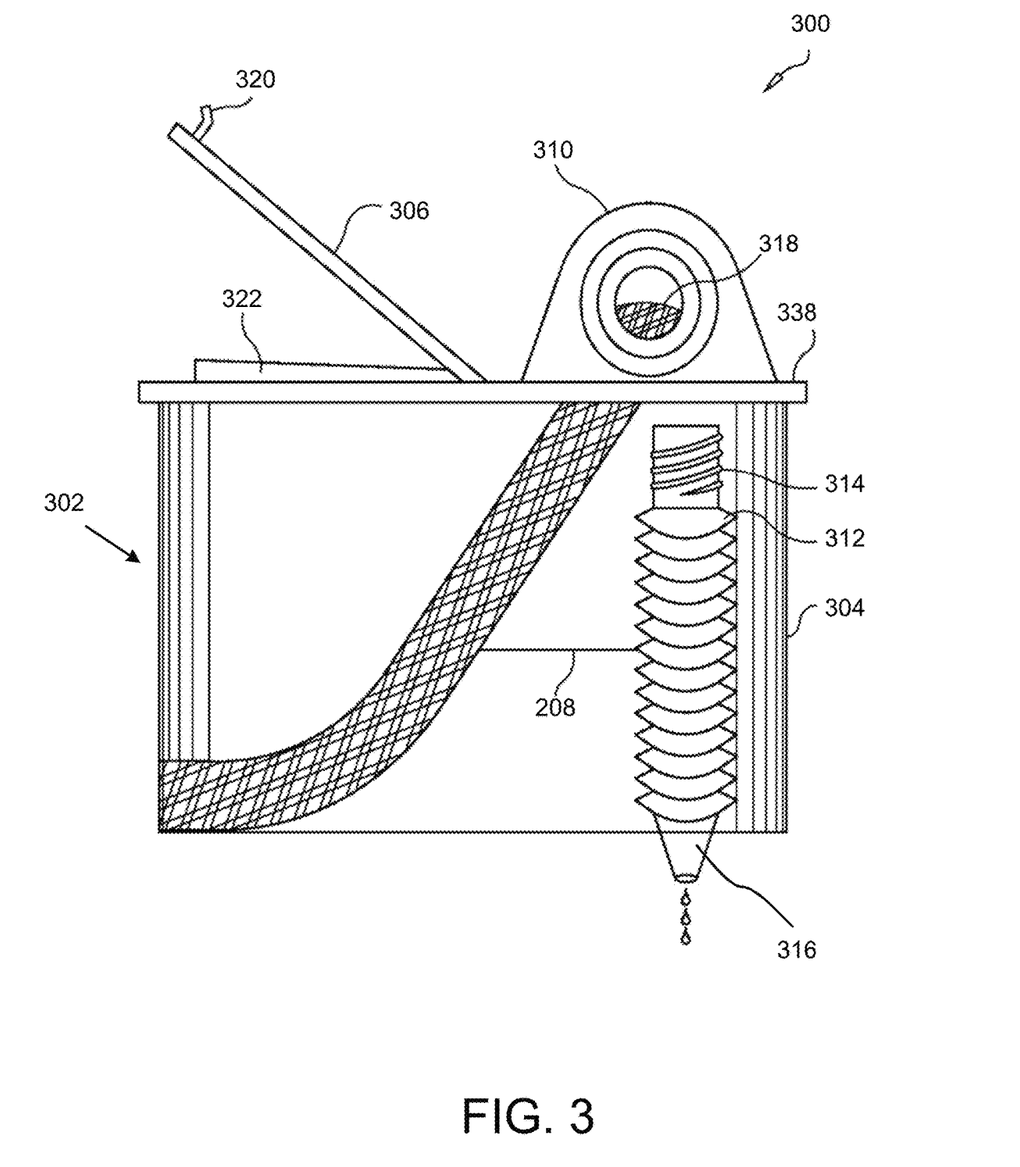
FIG. 3 is a sectioned side view of a second embodiment of a position adjustable self-watering apparatus operational on a plant container in accordance with the present invention.
Figure 4:
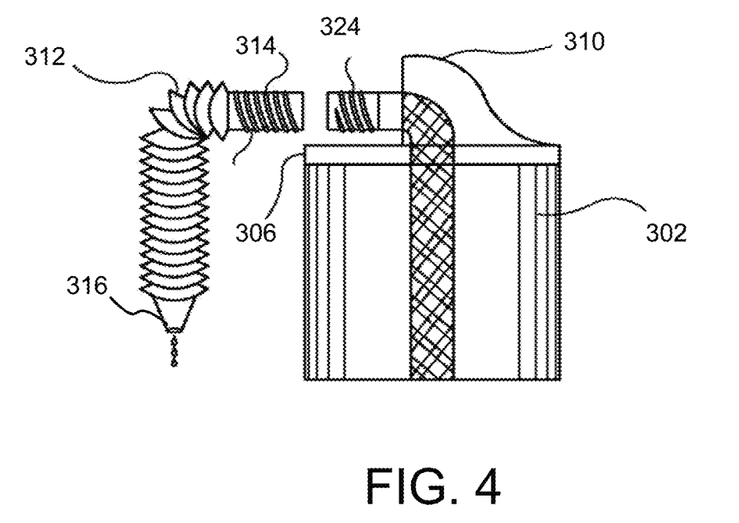
FIG. 4 is a side view of the position adjustable self-watering apparatus in FIG. 3 in accordance with the present invention.

FIGS. 3 and 4 illustrate sectioned side views of a second embodiment of a position adjustable self-watering apparatus 300 operational on a plant container 200. The apparatus 300 in this embodiment comprises a lid 306 having a tab 320. The lid 306 in this embodiment only partially covers the opening in the primary reservoir 302. Further, the lid 306 hingedly opens and closes over the opening through use of a hinge and an axis of rotation 340.

Various embodiments of the present invention may comprise a plurality of tubes 312, each comprising a wick 118 and/or wicking material. Multiple tubes 212 may extrude from the apparatus 300. There may be anywhere, in various embodiments, from one to hundreds of tubes forming the apparatus 100, 300.

Figure 5:
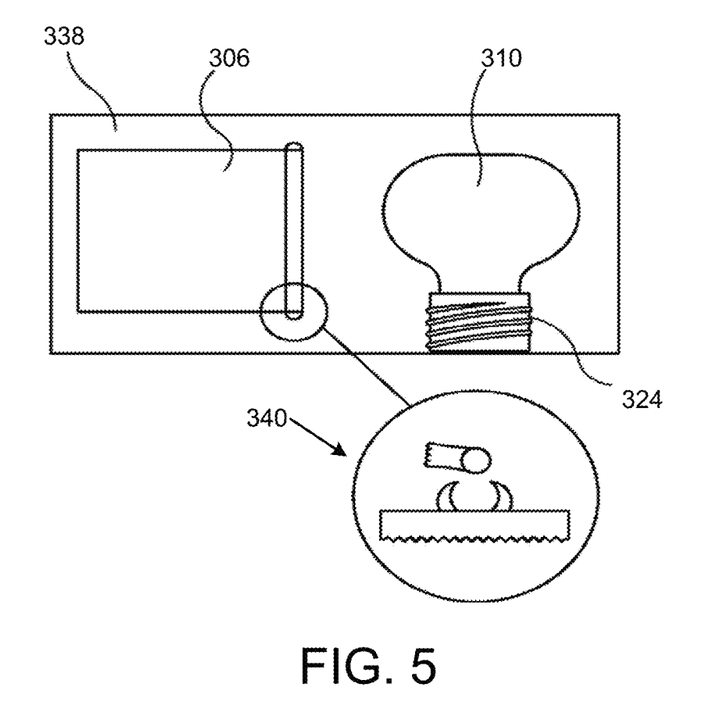
FIG. 5 is a top view of the position adjustable self-watering apparatus in FIG. 3 in accordance with the present invention.

As illustrated in FIG. 5, a seal member 322, such as a rubber gasket, is shaped to match the perimeter shape of the lid 306 and opening 140. The seal member 322 help to restrict insects from entering the primary reservoir 302, and also prevents spillage or contamination of the liquid 212. A top wall 308 covers the other portion of the opening. The sidewalls 304 form a generally rectangular shape and may be constructed from a molded plastic, a rigid polymer, metal, wood, fiberglass, and glass.

Figure 6:
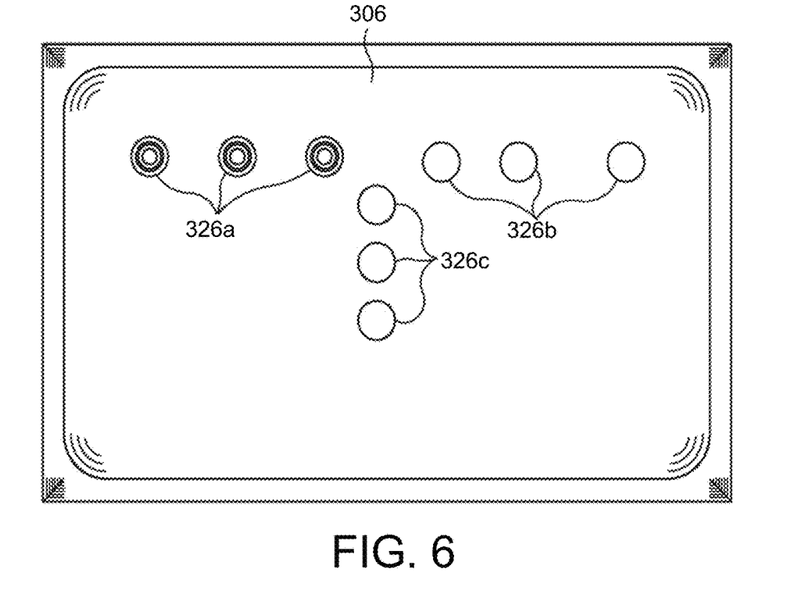
FIG. 6 is a bottom view of a bottom wall of the position adjustable self-watering apparatus in FIG. 3 in accordance with the present invention.
Figure 7:
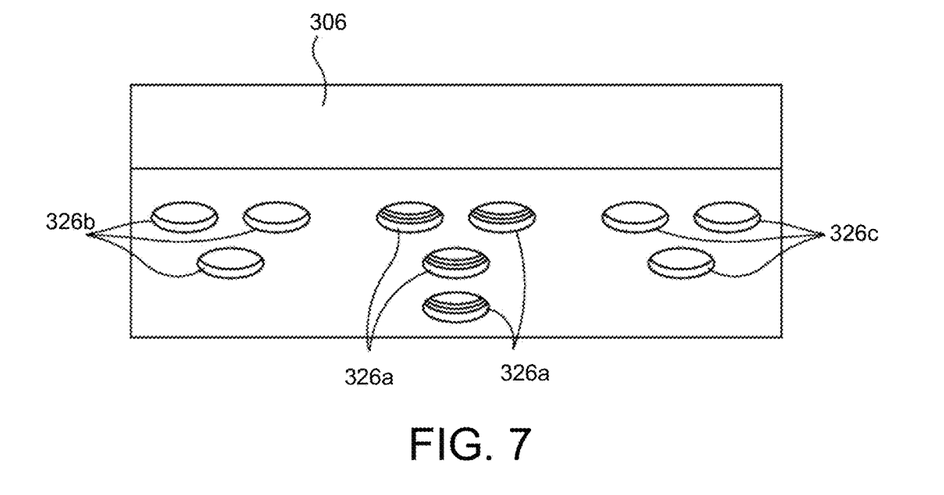
FIG. 7 is a perspective side view of a bottom wall of the position adjustable self-watering apparatus in FIG. 3 in accordance with the present invention.

Turning now to FIG. 6, a bottom wall 306 of the primary reservoir 302 comprises at least one reception aperture 326a-c. The reception aperture 326a-c is configured to receive to at least one anchor rod 308a-b. The reception aperture 326a-c may be threaded or beveled to form a friction fit with the anchor rod 308a-b. In one embodiment shown in FIG. 7, multiple reception apertures 326a-c from a spaced-apart relationship to provide different positioning options for at least one anchor rod 308a-b.

Figure 8A:
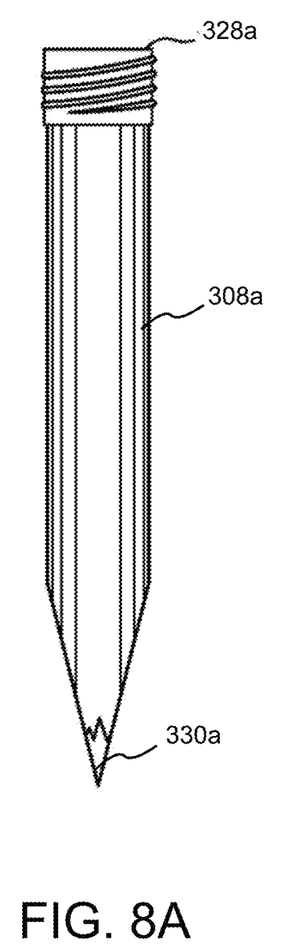
FIG. 8A is an anchor rod with a threaded reservoir end in accordance with the present invention.
Figure 8B:
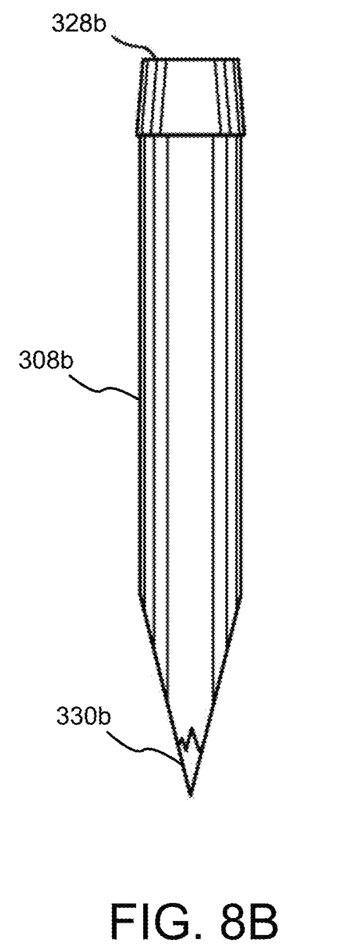
FIG. 8B illustrates a perspective view of an anchor rod with a beveled reservoir end in accordance with the present invention.

As illustrated in FIGS. 8A and 8B, the at least one anchor rod 308a-b provides the supportive foundation and positioning capacity for the primary reservoir, relative to the plant container. The anchor rod 308a may have a threaded mount end 330a (FIG. 8A), or a beveled mount end 330b (FIG. 8B). The anchor rod 308a-b comprises a reservoir end 328a-b that forms a snug, sealed engagement with the reception aperture 326a-b. The anchor rod 308a-b further comprises a mount end 330a-b that engages the soil directly or the container edge 202, so as to support the primary reservoir 302.

A tube housing 310 is also used in this embodiment of the apparatus 300. The tube housing 310 provides a base of support for a tube 312 that is flexible, yet incrementally fixed so as to enable directional orientation of the tube 312 for dispensing from a second end 316. A tube connection end 324 in the tube housing 310 couples a first end 314 of the tube 312 thereto. The present embodiment also utilizes capillary motion through a dual feed wick 318 partially immersed in the primary reservoir 302, and partially encased in the tube 312.

Figure 9:
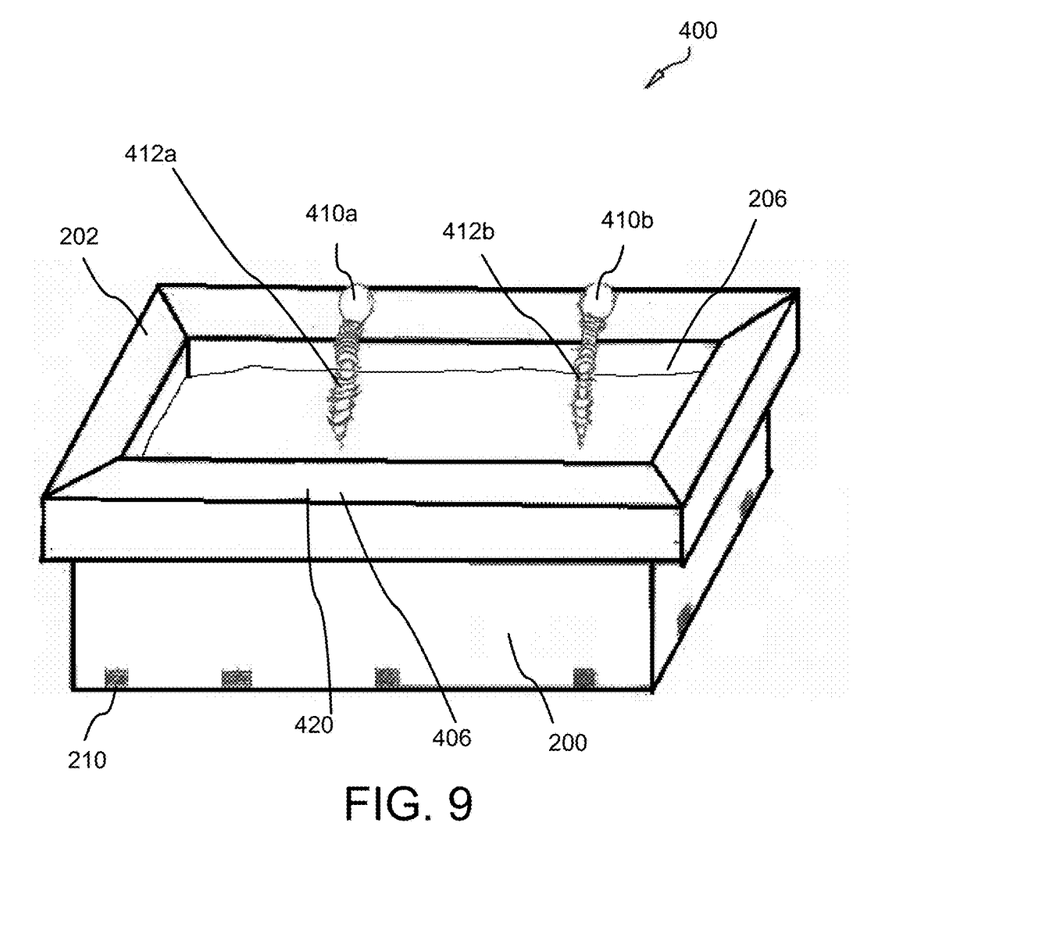
FIG. 9 is a perspective view illustrating a third embodiment of a position adjustable self-watering apparatus having two tubes for controllably dispensing water and nutrients in accordance with the present invention.

FIG. 9 is a perspective view illustrating a third embodiment of a position adjustable self-watering apparatus 400 having a pair of tubes 412a-b for controllably dispensing the liquid 212 from the primary reservoir. The pair of tubes 412 each mount on a respective tube housing 410a-b, and operate substantially the same as the single tube embodiment discussed above. Similar to the prior embodiment, a single lid 406 having a single tab 420 is operable for accessing an opening in the primary reservoir.

Figure 10:
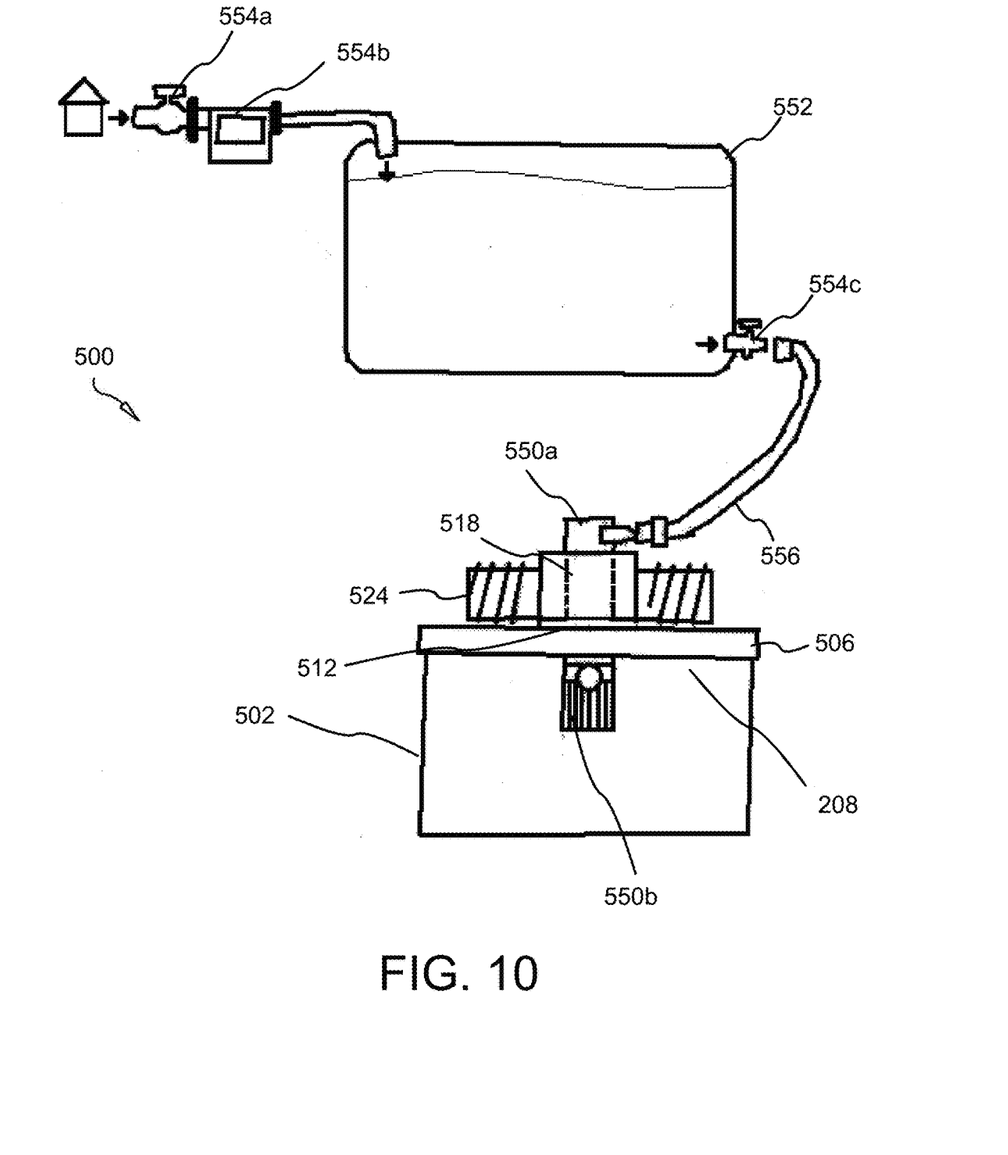
FIG. 10 is a diagram view illustrating another embodiment of a position adjustable self-watering apparatus receiving water from a secondary reservoir in accordance with the present invention.

FIG. 10 is a diagram view illustrating another embodiment of the position adjustable self-watering apparatus 500. The primary reservoir 502 here, receives water from a secondary reservoir 552. The secondary reservoir 552 may be used to supply a portion of the liquid 212 to the primary reservoir 502. The secondary reservoir 552 increases the liquid volume capacity of the apparatus 500. Thus, when the primary reservoir 502 is depleted, the secondary reservoir 552 may be called to supply liquid to the soil 206. This increases the possible duration of dispensing liquid and also increases the amount of plants 204 that can receive the liquid 212.

In one embodiment, a secondary reservoir tube 556 that is flexible, yet rigid serves to carry the liquid 212 from the secondary reservoir 552 to the primary reservoir 502. The secondary reservoir tube 556 may be configured substantially the same as the tube described above. Nonetheless, despite the addition of a secondary reservoir 552, the apparatus 500 operates substantially the same as discussed above. For example, a lid 506 supports a tube housing having a threaded tube connection end 524 that rotatably couples to a first end of a tube 512. The tube may then carry a tube portion of a dual feeding wick to transport the liquid 212 through capillary motion.

In this embodiment of the apparatus 500, the primary reservoir 502 may include at least one primary reservoir valve 550a-b for regulating and initiating discharge of the water from the primary reservoir 502. Similarly, at least one secondary valve 554a-c may be used to regulate the water and nutrients from the secondary reservoir 552. The secondary valve 554a-c may include a butterfly valve 554a, an electronic valve 554b, or a float valve 554c having a valve chamber and a valve chamber orifice, and various ball floats and/or elongated floats that work together to regulate dispensing of the liquid 212 from the secondary reservoir 552.

Figures 11A, 11B:
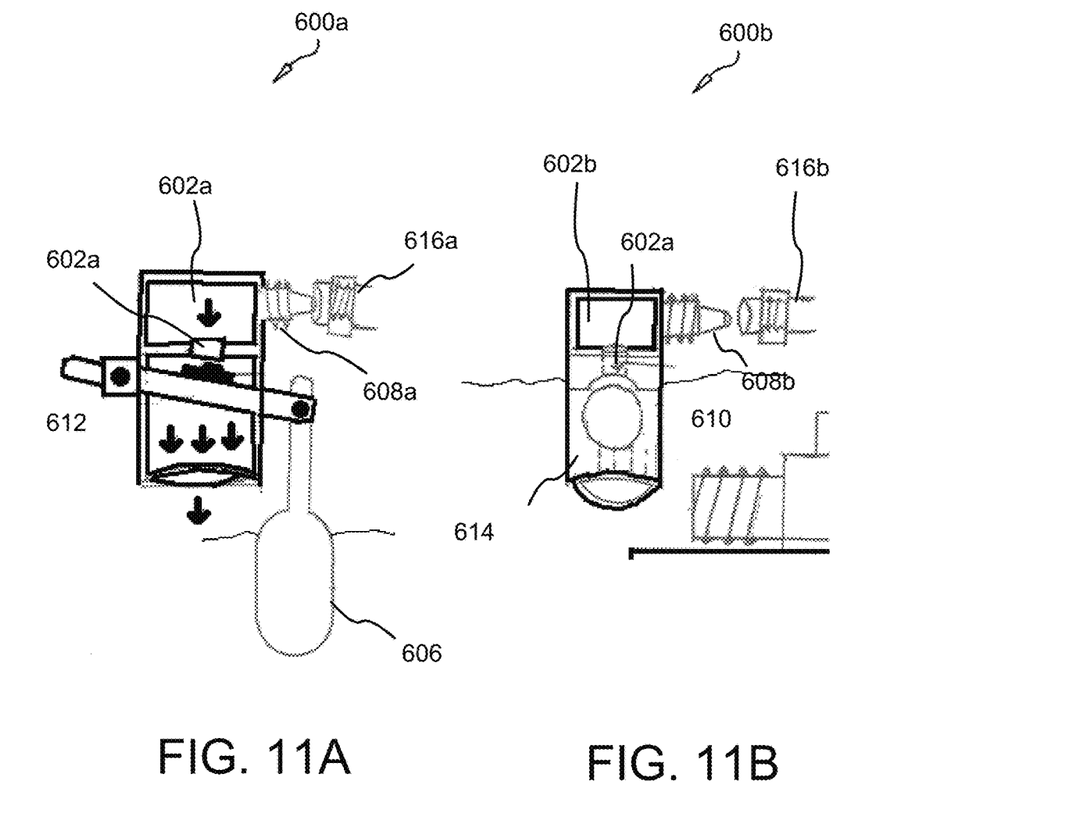
FIG. 11A illustrates a perspective view of a float valve in accordance with the present invention.
FIG. 11B illustrates a perspective view of an automated valve in accordance with the present invention.

FIGS. 11A and 11B illustrate perspective views of secondary reservoir valve 600a-b, where FIG. 11A is a float valve 600a, and FIG. 11B is an automated electrical valve 600b in accordance with the present invention. The float valve 600a, or ballcock, operates in substantially the same manner as float valves known in the art.

In one embodiment, the influent water is allowed to pass through a valve inlet 608a-b into a secondary reservoir tube 616a-b, while avoiding overflow and backflow. As the water level 208 drops in the secondary reservoir, a float ball 610 drops, allowing the water to flow through a valve chamber 602a-b through a valve chamber orifice 604a-b. From here, the water enters the primary reservoir. As the water level 208 in the secondary reservoir increases, the float ball 610 rises, eventually sealing off the valve chamber orifice 604a-b. In some embodiments, an elongated float 606 operatively connected to a float arm 612 falls and rises to open and shut the valve chamber orifice 604a-b.

In another embodiment, a float valve screen 614 provides up and down travel of the float ball 610. The screen 614 also allows air to escape before entering the valve chamber orifice 604a-b. This creates an air gap that helps prevent the float ball 610 from sealing the valve chamber orifice 604a-b, and consequently blocking the flow of influent water. Those skilled in the art will recognize that without the screen 614, the influent water may not stop, thereby causing backflow. Similar valves may also be used at the primary reservoir.

Thus, in one possible embodiment, the position adjustable self-watering apparatus 100 is configured to carry a liquid 212, such as water and/or nutrients, from the primary reservoir 02 to the second end 116 of the tube 112 through capillary motion. The apparatus 100 adjusts its portion relative to a plant container 200 to dispense the liquid 212 over a selected region of the soil 206. In one positional adjustment, at least one anchor rod 108a-b supports the primary reservoir 102 and selectively couples with at least one reception aperture 126a-b in the bottom wall 107 of the primary reservoir 102 to move the primary reservoir 102 relative to the plant container 200.

In yet another positional adjustment, the tube 112 is configured to incrementally and fixedly orient to a desired direction over a desired region of the soil 206 through a rigid, segmented configuration. In yet another positional adjustment, when the container edge wedges between the anchor rod and the sidewalls of the primary reservoir, the primary reservoir slides along the edge of the plant container to a desired region above the soil. The water is transmitted from the primary reservoir to the second end of the tube through capillary motion enabled by a dual feeding wick. At least one primary reservoir valve helps to regulate the flow of the liquid.

Figure 12:
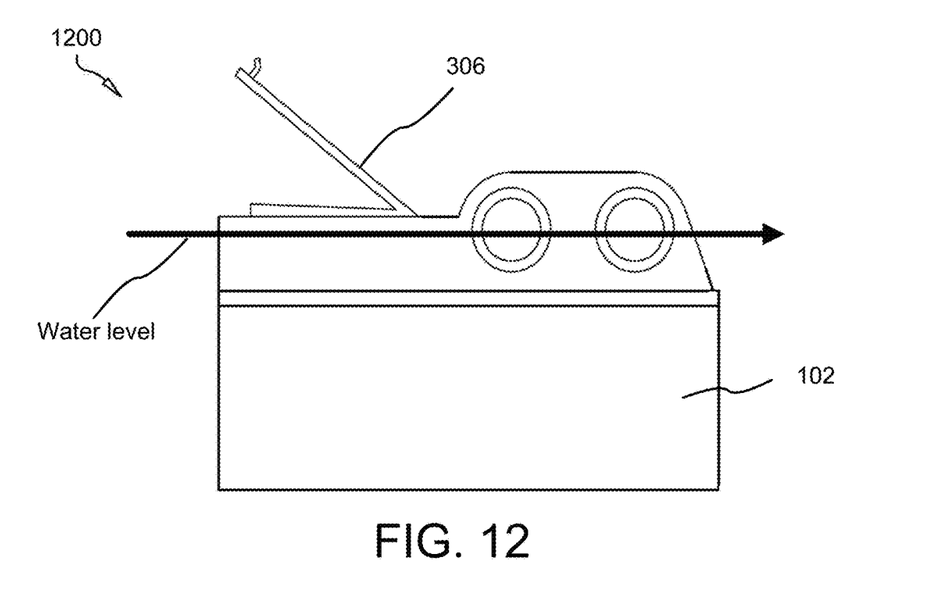
FIG. 12 is a diagram view illustrating another embodiment of a position adjustable self-watering apparatus receiving water from a secondary reservoir in accordance with the present invention.
Figure 13:
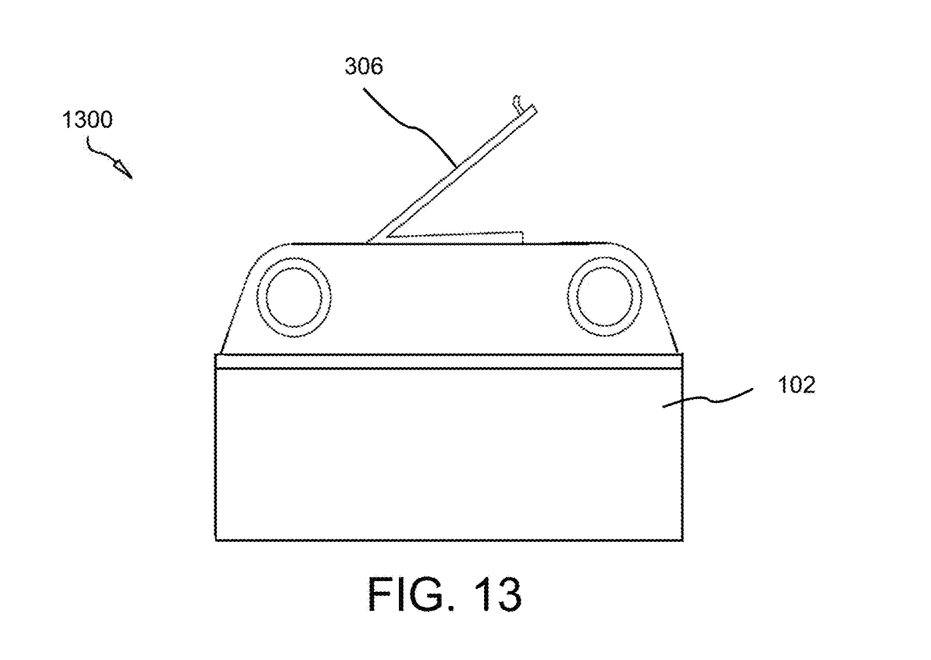
FIG. 13 is a diagram view illustrating another embodiment of a position adjustable self-watering apparatus receiving water from a secondary reservoir in accordance with the present invention.

FIG. 12 is a diagram view illustrating another embodiment of a position adjustable self-watering apparatus receiving water from a secondary reservoir in accordance with the present invention; and FIG. 13 is a diagram view illustrating another embodiment of a position adjustable self-watering apparatus receiving water from a secondary reservoir in accordance with the present invention.

The water level rises as water is added to the reservoir 102 until is rises above the connection points of the tubes 112 and overflows, rapidly starting the wicking process. The apparatus 100, 1200, 1300 may comprise means for collecting rainwater, including various species of funnels, and refilling the reservoir 102 with this runoff. The funnel may be partially filled with a soluble fertilizer.

Alternatively, the apparatus 100, 1200, 1300 may comprises means for collecting rain/precipitation before it comes in contact with the soil in the container 200, thus preventing excessive rain from washing nutrients out of the already moistened soil.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for position adjustable self-watering of a plant through capillary motion, the apparatus comprising:
    a primary reservoir, the primary reservoir configured to enable storage and dispensing of a liquid, the primary reservoir defined by a plurality of sidewalls, a bottom wall, a top wall, an opening, and a cavity;
    a lid, the lid configured to regulate access through the opening of the primary reservoir;
    a seal member, the seal member disposed to position between the primary reservoir and the lid, the seal member configured to restrict access to the cavity of the primary reservoir;
    a plurality of reception apertures, each of the reception apertures disposed to position at the bottom wall of the primary reservoir;
    a plurality of anchor rods, each of the anchor rods defined by a reservoir end and a mount end, the reservoir end configured to detachably attach to a respective one of the reception apertures, the mount end configured to enable mounting of the primary reservoir, whereby each of the anchor rods selectively engages a respective one of the reception apertures to reposition the primary reservoir relative to multiple mounted positions;
    a flexible tube, the tube configured to extend from a tube housing disposed on the primary reservoir, the tube defined by a first end, a second end, and an interior volume, the first end configured to join with the tube housing, the second end configured to dispense the liquid;
    a dual feeding wick, the dual feeding wick defined by a reservoir portion and a tube portion, the reservoir portion configured to engage the liquid in the primary reservoir, the tube portion disposed through the length of the interior volume of the tube, the dual feeding wick configured to enable capillary motion of the liquid from the primary reservoir to the second end of the tube; and
    at least one primary reservoir valve, the at least one primary reservoir valve configured to at least partially regulate flow of the liquid from the primary reservoir to the second end of the tube.

2. The apparatus of claim 1, wherein the reservoir is molded as a single integrated piece with a container for receiving soil.

3. The apparatus of claim 1, wherein the apparatus is configured to self-water a plant growing inside a plant container having a container edge.

4. The apparatus of claim 3, wherein each of the at least one reception aperture is threaded.

5. The apparatus of claim 4, wherein the reservoir end of each of the anchor rods is threaded.

6. The apparatus of claim 5, wherein the mount end of each of the anchor rods is pointed.

7. The apparatus of claim 6, wherein the mount end of each of the anchor rods is penetrates soil for mounting the primary reservoir.

8. The apparatus of claim 7, wherein the mount end of each of the anchor rods is and the plurality of sidewalls of the primary reservoir form a space for receiving the container edge for mounting the primary reservoir.

9. The apparatus of claim 1, wherein the lid hingedly opens and closes over the opening of the primary reservoir through a hinge and axis of rotation.

10. The apparatus of claim 1, wherein the lid comprises a tab, the tab configured to provide a surface for manipulating the lid.

11. The apparatus of claim 1, wherein the seal member is a rubber gasket.

12. The apparatus of claim 1, wherein the dual feeding wick is fabricated substantially from cotton.

13. The apparatus of claim 1, wherein the at least one primary reservoir valve includes at least one member selected from the group consisting of: a ball float valve, an automated electrical valve, a butterfly valve, a globe valve, and a two port valve.

14. The apparatus of claim 1, wherein the tube housing comprises a tube connection end, the tube connection end configured to couple to the first end of the tube.

15. The apparatus of claim 1, further including a secondary reservoir, the secondary reservoir configured to store a portion of the liquid.

16. The apparatus of claim 15, further including a secondary reservoir tube, the secondary reservoir tube configured to carry the liquid form the secondary reservoir to the primary reservoir.

17. The apparatus of claim 16, further including at least one secondary valve the at least one secondary valve configured to regulate the liquid dispensing from the secondary reservoir.

18. The apparatus of claim 17, wherein the at least one secondary valve includes at least one member selected from the group consisting of: a valve chamber, a valve chamber orifice, a float, a float arm, a float ball, and a float valve screen.

19. An apparatus for position adjustable self-watering of a plant through capillary motion, the apparatus comprising:
    a primary reservoir, the primary reservoir configured to enable storage and dispensing of a liquid, the primary reservoir defined by a plurality of sidewalls, a bottom wall, a top wall, an opening, and a cavity;
    a lid, the lid configured to regulate access through the opening of the primary reservoir;
    a seal member, the seal member disposed to position between the primary reservoir and the lid, the seal member configured to restrict access to the cavity of the primary reservoir;
    a plurality of reception apertures, each of the reception apertures disposed to position at the bottom wall of the primary reservoir;
    a plurality of anchor rods, each of the anchor rods defined by a reservoir end and a mount end, the reservoir end configured to detachably attach to a respective one of the reception apertures, the mount end configured to enable mounting of the primary reservoir, whereby each of the anchor rods selectively engages a respective one of the reception apertures to reposition the primary reservoir relative to multiple mounted positions;
    a tube, the tube configured to extend from a tube housing disposed on the primary reservoir, the tube defined by a first end, a second end, and an interior volume, the first end configured to join with the tube housing, the second end configured to dispense the liquid, the tube further configured to incrementally position the second end at an orientation;

a dual feeding wick, the dual feeding wick defined by a reservoir portion and a tube portion, the reservoir portion configured to engage the liquid in the primary reservoir, the tube portion disposed through the length of the interior volume of the tube, the dual feeding wick configured to enable capillary motion of the liquid from the primary reservoir to the second end of the tube;

at least one primary reservoir valve, the at least one primary reservoir valve configured to at least partially regulate flow of the liquid from the primary reservoir to the second end of the tube;

a secondary reservoir, the secondary reservoir configured to store a portion of the liquid;

a secondary reservoir tube, the secondary reservoir tube configured to carry the liquid form the secondary reservoir to the primary reservoir; and at least one secondary valve the at least one secondary valve configured to regulate the liquid dispensing from the secondary reservoir, the at least one secondary valve including at least one member selected from the group consisting of: a valve chamber, a valve chamber orifice, a float, a float arm, a float ball, and a float valve screen.

20. An apparatus for position adjustable self-watering of a plant through capillary motion, the apparatus comprising:

a primary reservoir, the primary reservoir configured to enable storage and dispensing of a liquid, the primary reservoir defined by a plurality of sidewalls, a bottom wall, a top wall, an opening, and a cavity;

a lid, the lid configured to regulate access through the opening of the primary reservoir;

a seal member, the seal member disposed to position between the primary reservoir and the lid, the seal member configured to restrict access to the cavity of the primary reservoir;

a plurality of reception apertures, each of the reception apertures disposed to position at the bottom wall of the primary reservoir;

a plurality of anchor rods, each of the anchor rods defined by a reservoir end and a mount end, the reservoir end configured to detachably attach to a respective one of the reception apertures, the mount end configured to enable mounting of the primary reservoir, whereby each of the anchor rods selectively engages a respective one of the reception apertures to reposition the primary reservoir relative to multiple mounted positions;

a pair of tubes, the pair of tubes configured to extend from a pair of tube housings disposed on the primary reservoir, each of the tubes in the pair of tubes defined by a first end, a second end, and an interior volume, the first end configured to join with the pair of tube housing, the second end configured to dispense the liquid, the pair of tubes further configured to incrementally position the second end at an orientation;

a dual feeding wick, the dual feeding wick defined by a reservoir portion and a tube portion, the reservoir portion configured to engage the liquid in the primary reservoir, the tube portion disposed through the length of the interior volume of the pair of tubes, the dual feeding wick configured to enable capillary motion of the liquid from the primary reservoir to the second end of the pair of tubes;

at least one primary reservoir valve, the at least one primary reservoir valve configured to at least partially regulate flow of the liquid from the primary reservoir to the second end of the tube;

a secondary reservoir, the secondary reservoir configured to store a portion of the liquid;

a secondary reservoir tube, the secondary reservoir tube configured to carry the liquid form the secondary reservoir to the primary reservoir; and at least one secondary valve the at least one secondary valve configured to regulate the liquid dispensing from the secondary reservoir.

\* \* \* \* \*